United States Patent [19]

Weiger et al.

[11] Patent Number: 4,617,969
[45] Date of Patent: Oct. 21, 1986

[54] ACTUATING DEVICE FOR TWO MUTUALLY DEPENDENTLY ACTUABLE VALVES

[75] Inventors: Günter Weiger, Esslingen; Dieter Dörrie, Plochingen; Paul Schwerdt, Freudenstadt, all of Fed. Rep. of Germany

[73] Assignee: Daimler-Benz Aktiengesellschaft, Fed. Rep. of Germany

[21] Appl. No.: 675,003

[22] Filed: Nov. 26, 1984

[30] Foreign Application Priority Data

Nov. 26, 1983 [DE] Fed. Rep. of Germany ....... 3342951

[51] Int. Cl.4 .......................................... F15B 13/044
[52] U.S. Cl. ............................. 137/627.5; 137/596.17; 251/129.06
[58] Field of Search ...................... 137/596.17, 627.5; 251/129.06

[56] References Cited

U.S. PATENT DOCUMENTS 2,622,565 12/1952 Venus ................................ 137/627.5

Primary Examiner—Gerald A. Michalsky
Attorney, Agent, or Firm—Barnes & Thornburg

[57] ABSTRACT

An apparatus is provided for sequentially actuating a pair of valves used to control a flow of brake fluid in a vehicle. Each valve is yieldably biased toward a normal position. The apparatus includes an actuation member that is tiltable in response to movement of a piezoelectric member to accomplish sequential operation of the valve pair, the actuating member being tiltable during a first adjustment stroke counter to the force of the first valve spring about a first axis of rotation defined by a bearing point fixed to the housing and by a compression spring in order to actuate the first valve and move the first tappet to a selected position. The actuating member is also tiltable during a second adjustment stroke counter to the force of the compression spring about a second axis of rotation defined by the bearing point fixed to the housing and by the moved first tappet in order to actuate the second valve.

4 Claims, 4 Drawing Figures

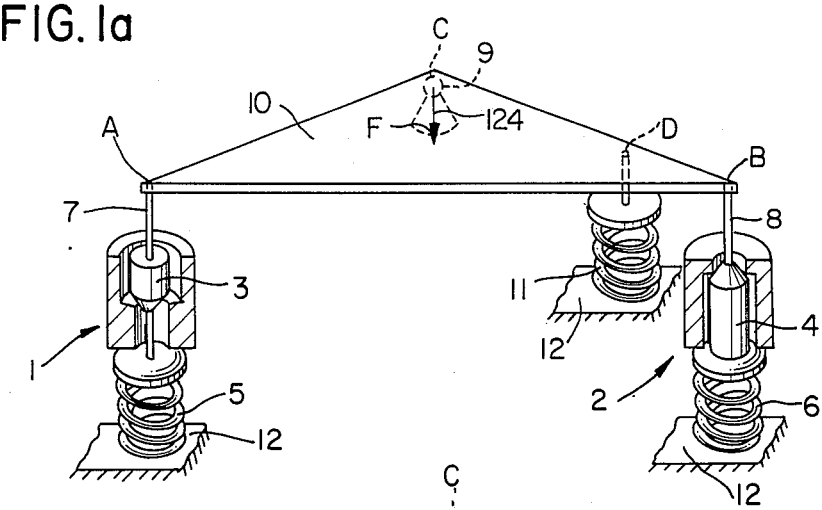
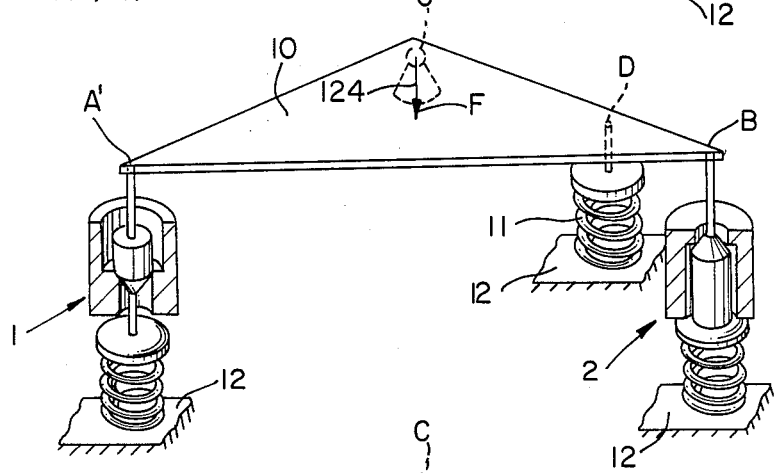
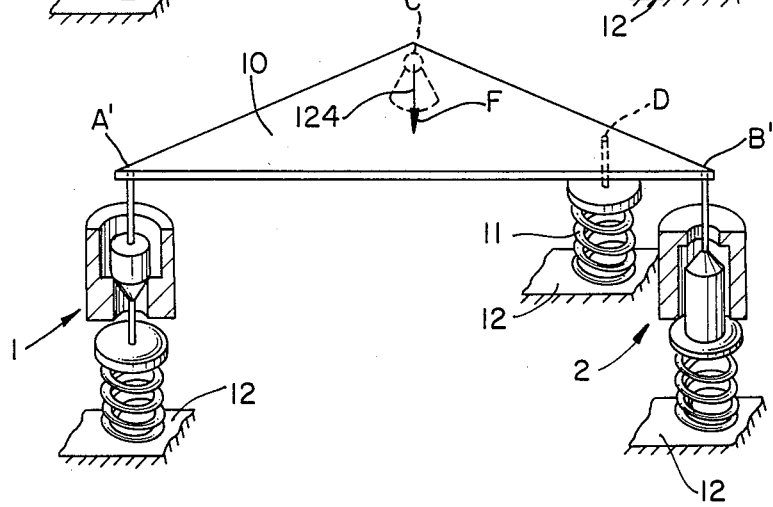

ACTUATING DEVICE FOR TWO MUTUALLY DEPENDENTLY ACTUABLE VALVES

BACKGROUND AND SUMMARY OF THE INVENTION

The invention relates to a device for sequentially actuating a pair of valves. More particularly, this invention relates to a pressure control unit for actuating an inlet valve and an outlet valve to control the brake fluid of a wheel brake cylinder of a vehicle equipped with an anti-locking brake system. The inlet and outlet valves used to control the flow of brake fluid are required to be capable of mutually coordinated, non-overlapping operation at the most rapid speed attainable. That is to say, it is important that the normally closed outlet valve be opened only when the normally open inlet valve is closed. Piezoelectrically actuated valves with operating times less than 100 microseconds and locking forces of up to 7000 Newton are known. However, the adjustment stroke is short—approximately 0.07 mm. Typically, separate valves, each with an electromagnetic or piezoelectric adjusting element have been used for the inlet valve and outlet valve.

One object of the invention is to develop a device for coordinating the actuation of two interdependent valves, which reduces overlapping operation of the two valves to an acceptable amount, exhibits a sufficiently long adjustment stroke, and is also simple and inexpensive to produce.

According to the present invention, an apparatus is provided for actuating a pair of valves in sequence. A preferred embodiment of the apparatus includes a housing, a first and second valve mounted in the housing for movement in relation to the housing. The first valve includes a first tappet and a first spring means for yieldably biasing the first valve toward a normal position. The second valve includes a second tappet and a second spring means for yieldably biasing the second valve toward a normal position. The apparatus further includes an actuating member and a means for mounting the actuating member within the housing to selectably engage the first tappet, the second tappet, and a bearing point member. The bearing point member is fixed to the housing to lie on other than a line joining the two valve tappets. An actuator spring means is also provided for yieldably biasing the actuating member toward a normal position. The actuator spring means is situated intermediate a portion of the housing and the actuating element and in proximity to the second tappet. The actuator spring means has a spring force greater than the spring forces of each of the first and second spring means. An adjusting member is provided for tilting the actuating member to sequentially actuate the first and second valves. The actuating member is tiltable during a first adjustment stroke counter to the force of the first valve spring about a first axis of rotation defined by the bearing point fixed to the housing and by the compression spring in order to actuate the first valve and move the first tappet to a selected position. The actuating member is also tiltable during a second adjustment stroke counter to the force of the compression spring about a second axis of rotation defined by the bearing point fixed to the housing and by the second first tappet in order to actuate the second valve.

The actuating device of the present invention makes possible the actuation of both valves with one adjusting element. One conventional adjusting element is therefore dispensed with. Furthermore, overlapping operation of the two valves is reduced, because the second valve can be actuated only when the first has already reached its work position. Another advantage which may be mentioned, and which is particularly significant for piezoelectrical adjusting elements, is the definition of a lever arm between an adjusting element and the valve tappets for leveraging movement of the valve tappets which exhibits a ratio of 1:3. This leverage ratio is the same for both of the first and second valves.

Further objects, features, and advantages of the present invention will become more apparent from the following description when taken with the accompanying drawings which show, for purpose of illustration only, an embodiment in accordance with the present invention.

BRIEF DESCRIPTION OF THE DRAWINGS

FIG. 1a is a diagrammatic view of an actuating device embodying the present invention showing an open inlet valve and a closed outlet valve;

FIG. 1b is a view of the invention illustrated in FIG. 1a showing a closed inlet valve and a closed outlet valve;

FIG. 1c is a view of the invention illustrated in FIG. 1a showing a closed inlet valve and an open outlet valve;

DETAILED DESCRIPTION OF THE DRAWINGS

Figure 2:
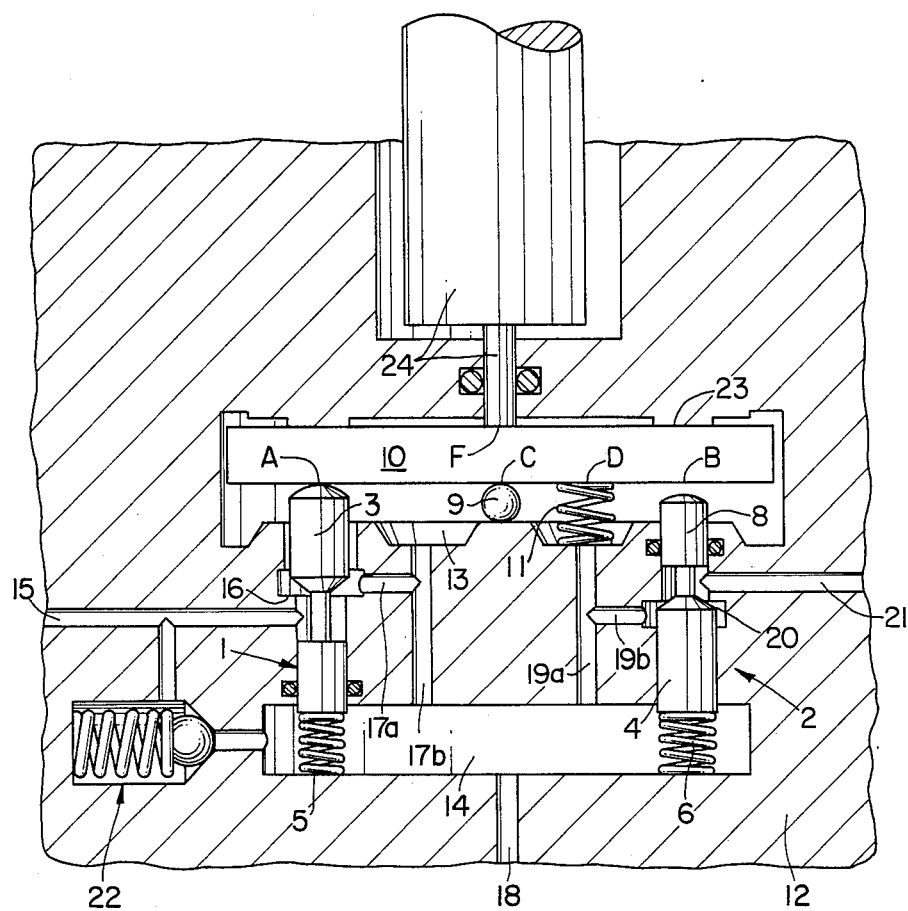
FIG. 2 is a sectional elevation view of a preferred embodiment of the present invention.

FIG. 1a shows in a diagrammatic view an inlet valve 1, open in the rest position, and an outlet valve 2, closed in the rest position. First and second valve pistons 3 and 4 are maintained in their rest position by first and second valve springs 5 and 6, respectively, and are actuated via first and second valve tappets 7 and 8, respectively. Both valves are mounted in a common housing 12. An actuating element 10 engages the two valve tappets 7, 8 and a bearing point 9 fixed to the housing which cooperate to form the apexes of an equilateral triangle. The actuating element 10 is represented in FIGS. 1a–1c as a triangle A, B, C connecting the three points of support. A compression spring 11 is arranged between a plane fixed to the housing and the actuating element 10 in proximity of the second valve tappet 8 to engage the actuating element 10 at the point D and to support valve spring 6. Spring 11 has a spring force that is greater than that of the two valve springs 5 and 6. The adjusting element, indicated here in FIGS. 1a–1c as an arrow 124, engages the triangle A, B, C at its center F. The compression spring 11 may also engage at the point B; however, the point D located on the joining line B-C is chosen in the drawing for better facility of diagrammatic illustration.

When the adjusting element 124 is then moved downward, the actuating element 10 is rotated about the edge C-D to cause point A to move downward to point A' and to close the inlet valve 1. This position is illustrated in FIG. 1b. The axis of rotation in the straight line C-D is determined by the fixed bearing point 9 and by the compression spring 11, which is stronger than the valve spring 5.

When the adjusting element is then moved further downward, as shown in FIG. 1c, the axis of rotation changes into the joining line A'-C, because the point A' must likewise be considered as a fixed bearing point due to the closed inlet valve 1. Point B is then moved downward to point B, and the outlet valve 2 is hence opened.

A lever arm is defined due to the geometrical arrangment of the points A, B and C as apexes of an equilateral triangle, and of the engagement point F of the adjusting element at the center and/or center of gravity of the latter. The lever arm is characterized by a trebling of the adjustment stroke of the valve tappets 7 and 8 relative to the adjustment stroke of the adjusting element 124.

One exemplary embodiment is illustrated in section in FIG. 2. The inlet valve 1 and the outlet valve 2 are arranged between an upper chamber 13 and a lower chamber 14 in a valve housing 12 wherein the inlet valve 1 includes the first valve piston 3 and the first valve spring 5 and is shown to be open in the rest position. The outlet valve 2 includes the second valve piston 4 and the second valve spring 6 and is shown to be closed in the rest position.

A pressurized medium passes from a storage tank (not shown) by means of a pressure pump (not shown) via an inlet bore 15, the valve seat 16 of the inlet valve 1 and the bores 17a and 17b into the upper and lower chambers 13 and 14 respectively. The pressurized medium then passes from the lower chamber 14 to a pressure cylinder of a wheel brake (now shown) via a bore 18.

From there and/or from the upper or lower chamber 13, 14, it passes back to the storage tank along the same path or via further bores 19a and 19b to the valve seat 20 of the outlet valve 2. When the latter is opened, the pressurized medium passes back to the storage tank via a return bore 21. A safety return flow valve 22 is arranged between the inlet bore 15 and the lower chamber 14. The safety return flow valve 22 operates to dissipate the pressure in the pressure cylinder if the inlet valve 1 fails to open for some reason and no pressure is present in the inlet bore 15.

The actuating element 10 is arranged in the upper chamber 13 in such a way that it rests upon the bearing point 9 fixed to the housing. The bearing point 9 is constructed as a ball. The actuating element 10 (in its rest position illustrated in FIG. 2) is pressed by the first valve piston 3, which serves simultaneously as valve tappet, via the first valve spring 5 and by the compression spring 11 against a surface 23 fixed to the housing. The second valve tappet 8 of the outlet valve does not abut the actuating element 10 in the rest position, but has a short distance away from the latter. The reason for this is explained later.

A piezoelectric adjusting element 24, which in the unactuated state rests upon the actuating element 10 occupying the rest position, is arranged above the upper chamber 13 in the housing 12. The points A, B, C, D and F are also marked in FIG. 2 for better comparison with FIG. 1.

The function of the device has already been described in detail above (description of FIGS. 1a, b, c). The interstice between valve tappet 8 and the actuating element 10 in the rest position is provided to prevent the outlet valve from opening slightly, when the actuating element rotates about the axis C-D during the actuating of the inlet valve. The outlet valve may otherwise open, because the compression spring 11 yields slightly in spite of its greater spring force.

When used as a pressure control unit for a wheel brake of a vehicle, it is therefore possible for the pressure in the wheel brake cylinder, not shown, to be increased (FIG. 1a), maintained constant (FIG. 1b), or reduced (FIG. 1c). The advantage of this is that only a single adjusting element is necessary for this purpose, the adjustment stroke of which is amplified via a lever arm acting in the same manner on both the inlet and the outlet valves. Moreover, the entire unit is accommodated in a common housing with few components in an inexpensive, compact and trouble-free manner.

Although the invention has been described in detail with reference to certain preferred embodiments and specific examples, variations and modifications exist within the scope and spirit of the invention as described and defined in the following claims.

What is claimed is:

1. An apparatus for actuating a pair of valves in sequence, the apparatus comprising:
   a housing,
   a first and second valve mounted in the housing for movement in relation thereto, the first valve including a first tappet and a first spring means for yieldably biasing the first valve toward a normal position, the second valve including a second tappet and a second spring means for yieldably biasing the second valve toward a normal position,
   an actuating member,
   means for mounting the actuating member within the housing to selectably engage the first tappet, the second tappet, and a bearing point member fixed to the housing to lie on a line other than a line joining the two valve tappets,
   an actuator spring means for yieldably biasing the actuating member toward a normal position, the actuator spring means being situated intermediate a portion of the housing and the actuating element and in proximity to the second tappet, and having a spring force greater than the certain spring forces of each of the first and second spring means, and
   an adjusting member for tilting the actuating member to sequentially actuate the first and second valves, the actuating member being tiltable during a first adjustment stroke counter to the force of the first valve spring about a first axis of rotation (C-D) defined by the bearing point (C) fixed to the housing and by the compression spring in order to actuate the first valve and move the first tappet to a selected position, the actuating member being tiltable during a second adjustment stroke counter to the force of the compression spring about a second axis of rotation (C-A) defined by the bearing point fixed to the housing and by the moved first tappet in order to actuate the second valve.

2. The apparatus of claim 1, wherein the first tappet, the second tappet, and the bearing point member cooperate to define an equilateral triangular portion of the actuating member, and the adjusting member is positioned to engage said triangular portion of the actuating member.

3. The apparatus of claim 1, wherein the first valve is normally open.

4. The apparatus of claim 1, wherein the second valve is normally closed.

* * * * *